United States Patent
Morikawa et al.

(10) Patent No.: US 6,658,411 B2
(45) Date of Patent: Dec. 2, 2003

(54) MESSAGE-FILE STORING/RETRIEVING SYSTEM BY COMPUTER

(75) Inventors: Yoichiro Morikawa, Yokohama (JP); Motoaki Hirabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 83 days.

(21) Appl. No.: 10/000,167

(22) Filed: Dec. 4, 2001

(65) Prior Publication Data

US 2002/0087512 A1 Jul. 4, 2002

(30) Foreign Application Priority Data

Dec. 14, 2000 (JP) ........................................ 2000-380210

(51) Int. Cl.$^7$ ............................................... G06F 17/30
(52) U.S. Cl. ........................................... 707/4; 715/523
(58) Field of Search ................................ 715/523; 707/4

(56) References Cited

U.S. PATENT DOCUMENTS 6,029,182 A * 2/2000 Nehab et al. ............... 715/523
6,493,717 B1 * 12/2002 Junkin ........................ 707/102

FOREIGN PATENT DOCUMENTS

JP 9-106331 4/1997

* cited by examiner

Primary Examiner—Charles L. Rones
(74) Attorney, Agent, or Firm—McDermott, Will & Emery

(57) ABSTRACT

In message retrieval, a system is provided wherein both a message to be retrieved and a message related to the original message are acquired as a result of retrieval. The original message read from a DB 101 and displayed on a user's PC 108 by a message display section 103 is given to a response generating section 104. When a response message to the message is input by the user, and an instruction is given to the response generating section 104, a response message file is created, its file name is made by adding a branch number indicating the association to the file name of the original message file, and the response message file is stored in the DB 101 by a message storing section 102. When retrieving a message, a message file containing a keyword specified by the user is retrieved from the database by the message retrieving section 105 and, as a result of retrieval, the message file and a message file having a file name made by adding a branch number to the file name of the file are output.

5 Claims, 8 Drawing Sheets file format (message log retrieval)

| machine name | event ID | time stamp | branch number | contents of information |
|---|---|---|---|---|
| server A | KAJG111-E | 2000.07.01 | | server C is down |
| server A | KAJG111-E | 2000.07.01 | _1 | file is reloaded in server C |
| server A | KAJG111-E | 2000.07.01 | _1_1 | server C is short of disk space |
| server A | KAJG111-E | 2000.07.01 | _1_1_1 | refer to log file in server B |
| . . | . . | . . | . . | . . | whole configuration (home page retrieval)

FIG.2
file format (home page retrieval)

(A) message file     201

| file name | title | contents of information |
|---|---|---|
| www.xxx.co.jp_2000.06.25 | about C programing language | tell me about C |
| www.xxx.co.jp_2000.06.25_1 | Re: about C programing language | how to handle memory of C programing language |
| ⋮ | ⋮ | ⋮ |

(B) link file     202

| file name | title | contents of information |
|---|---|---|
| www.xxx.co.jp_2000.06.25_-1 | Ln: about C programing language | www.yyy.co.jp |
| ⋮ | ⋮ | ⋮ | flowchart to show how message is stored flowchart to show how message is retrieved whole configuration (message log retrieval)

FIG.6
file format (message log retrieval)

| machine name | event ID | time stamp | branch number | contents of information |
|---|---|---|---|---|
| server A | KAJG111-E | 2000.07.01 | | server C is down |
| server A | KAJG111-E | 2000.07.01 | _1 | file is reloaded in server C |
| server A | KAJG111-E | 2000.07.01 | _1_1 | server C is short of disk space |
| server A | KAJG111-E | 2000.07.01 | _1_1_1 | refer to log file in server B |
| ⋮ | ⋮ | ⋮ | ⋮ | ⋮ | flowchart to show how log message is stored flowchart to show how log message is retrieved

MESSAGE-FILE STORING/RETRIEVING SYSTEM BY COMPUTER

BACKGROUND OF THE INVENTION

1. Field of the Invention

The present invention relates to a storing/retrieving system of information by a computer. In particular, it relates to a system acquiring retrieved results together with messages, messages related to home pages and home page information.

2. Description of the Related Art

There is an enormous amount of information stored on the Internet, and the contents thereof are updated day by day. In order to take necessary information out of such information, search engines are utilized.

When retrieval is done by a keyword making use of a search engine, a list of links to home pages containing specified keywords is displayed. When a relevant link among them is chosen and clicked by a mouse and so on, the applicable home page is displayed.

Also, electronic bulletin boards such as the one disclosed in JP-A-106331/1997 are used on the Internet. A plurality of articled are posted for each subject on an electronic bulletin board. With regard to some of the articles, related articles as responses or opinions to the original article are posted. In such a case, there is associated relation between those articles.

Further, instead of electronic bulletin boards, a form called a mailing list is used to send multicasting mail to a specific group. Such mail is used for sharing information, sending articles and discussing opinions, etc. on the articles.

Those articles and mail are stored as massages in Web servers and mail servers for a certain period.

On the other hand, when running an application program on a computer, various events occur as a result.

For example, when output to a printer is over or the application program is ended abnormally, occurrence of the event is reported to a system manager as a massage, which is recorded in a message log.

Further, in relation to the occurrence of the event, an operation such as automatically starting a command is conducted.

When a search engine is used on an electronic bulletin board, messages containing a specified keyword are retrieved. On the electronic bulletin board, however, a massage of question and a message of response are independent messages. Therefore, even if messages containing keywords are retrieved, necessary information is still missing there.

Also, when exchanging information on a mailing list, questions and responses are separate mails. Therefore, even when mail containing the keyword alone is retrieved, the meaning of the response is not clear.

In the case of a message to be reported as a result of running the application program, an operator may respond to the message or a command is executed by automatic response. However, another event is caused by the response of the operator or by the execution of the command and, as a result of this, still another message occurs.

These are recorded in a message log. When a keyword search is conducted later in a particular event in the message log, messages containing the keyword are retrieved. However, messages related to them are not retrieved, and there has been a problem of requiring enormous efforts to retrieve related messages that caused the inconvenience.

For example, when there is a keyword to correspond to a message which is recorded as a result of a command, the message of the command is retrieved by the keyword. However, as to the message which caused the execution of the command, it requires time and effort to investigate the message log manually.

SUMMARY OF THE INVENTION

Therefore, in message retrieval, it is the object of the present invention to provide a system which acquires both a message to be retrieved and a message related to the message as a retrieval result.

In order to achieve the above object, the system of the present invention comprises: a means to give, as a file name of a message file of a second message generated as a message related to a first message, a file name of a message file of the first message having caused the second message, and further to give the file name branch-number information showing that the second message is a message related to the first message; a means to store the message file in a database connected to a computer; and a means to retrieve, according to a keyword, a message file containing the keyword from the database and, as a result of the retrieval, to output the message file and a message file having a file name which is made by giving the branch-number information to the file name of the message file.

Further, the system of the present invention comprises: a means to give, when storing while linking the message file of the second message in the database connected to another computer, a file name of the message file of the first message as a file name of the message file and, further, to give the file name branch-number information showing that the second message is related and linked to the first message, and to generate, as contents of information of the message file, a link file to which storing address of the database connected to another computer in which the message file of the second message is stored; and a means to store the generated link file in the database connected to the computer.

Other and further objects, features and advantages of the invention will appear more fully from the following description.

BRIEF DESCRIPTION OF THE DRAWINGS

A preferred form of the present invention illustrated in the accompanying drawings in which:

FIG. 2 shows a format of a file to be stored in a message storing DB in the embodiment;

FIG. 6 shows a format of a file to be stored in a log-file storing DB in the second embodiment;

DESCRIPTION OF THE PREFERRED EMBODIMENT

Now, an embodiment of the present invention will be described with reference to drawings.

Figure 1:
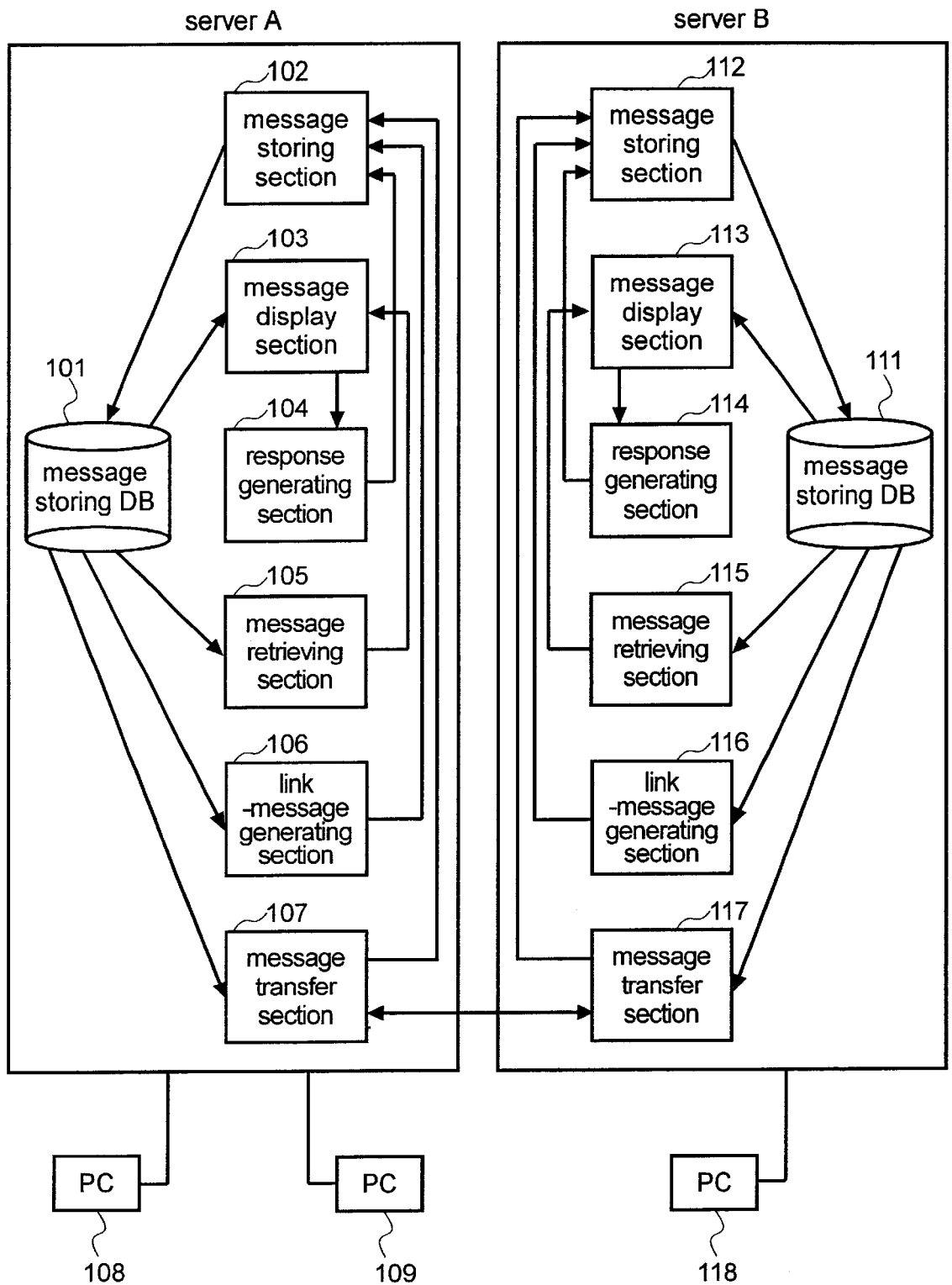
FIG. 1 shows a whole configuration of an embodiment of the present invention and, in particular, it shows a case when a message is the one in a home page.

FIG. 1 shows a whole configuration of the embodiment of the present invention and, in particular, it shows a case when a message is the one in a home page.

In FIG. 1, as to Server A and Server B, the configuration of the portions related to the present invention only is shown.

Server A comprises: a message storing DB (101) storing messages; a message storing section (102) performing the process of storing the messages in the DB; a message display section (103) displaying the message for a user; a response generating section (104) generating a responses to the message; a message retrieving section (105) retrieving messages stored in the DB; a link-message generating section (106) generating a link message for another message related to the message; and a message transfer section (107) communicating with other servers.

Further, the above message display section (103) in Server A creates display information of the message and, in practice, the created display information is sent to a user's PC connected to the server and is displayed on the PC.

Such a configuration is provided to every server. Namely, there is Server B having the same functions (111 to 117) as those (101 to 107) configured in Server A. Messages are sent and received between Servers A and B through the message transfer sections (107, 117).

FIG. 2 shows a format of a file to be stored in the message storing DB in the present invention.

Files are classified into message files (201) storing contents of messages themselves, link files (202) storing the addresses to which the files wherein the contents are stored are linked.

URLs, time stamps and branch numbers are given to file names. A branch number "_1" is given to a response message and a branch number "_-1" is given to a related message.

Thus, by retrieving files which have the same file names and branch numbers, related messages and response messages of the message in question can be easily retrieved.

Figure 3:
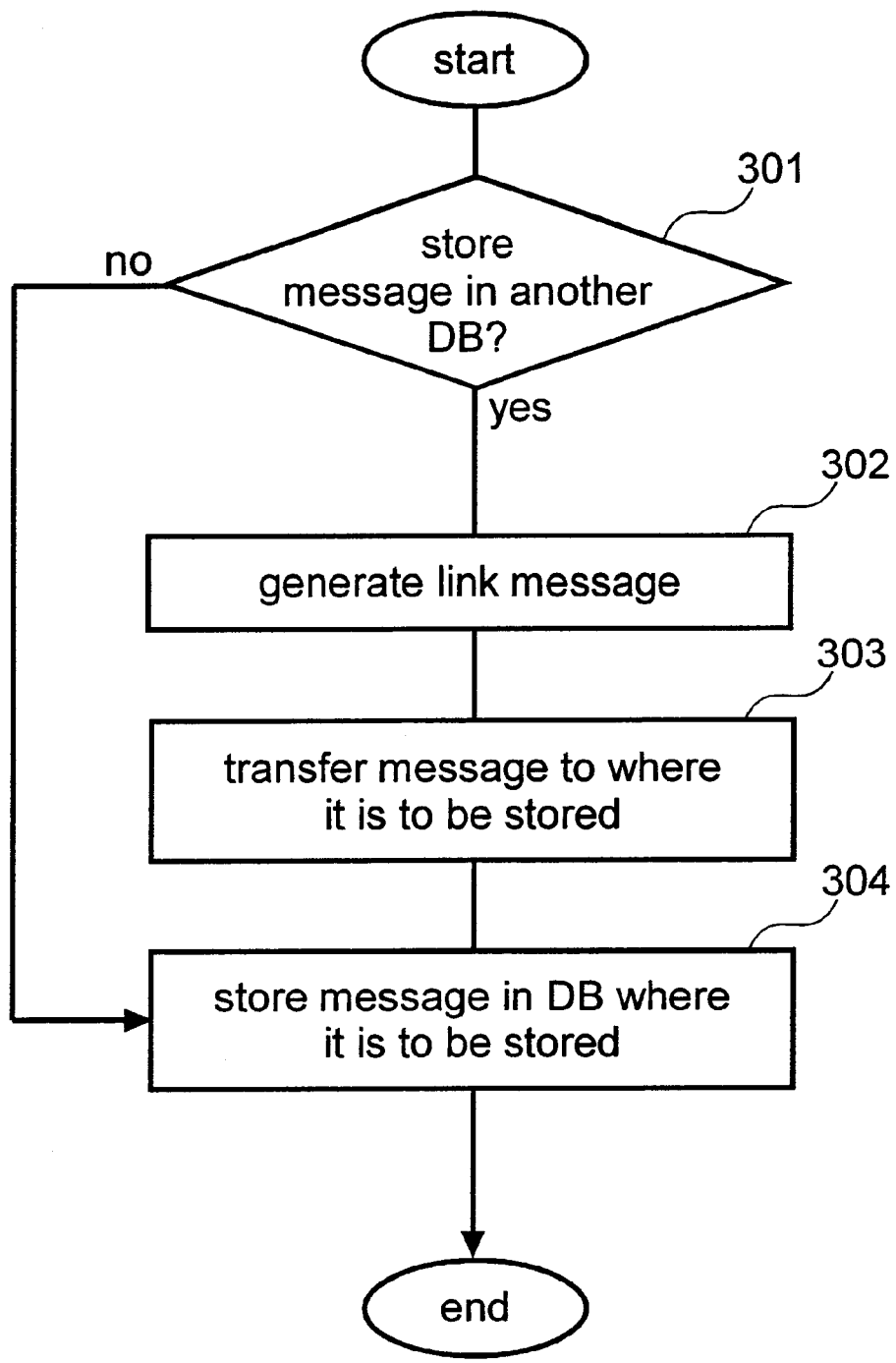
FIG. 3 is a flowchart to show how a message is stored in the embodiment.

FIG. 3 is a flowchart to show how a messages is stored in the embodiment.

When newly storing a message as a response to the message being displayed by the message display section (103) of the present server (hereinafter referred to as "Server A"), a response generating section (104) is called and information (titles, contents of information, etc.) of the message held by the message display section (103) is given to the response generating section.

When a user enters a message which is to be a response to the original message, and requests the response generating section (104) to create a response message, the response generating section (104) performs the process to indicate that the message is the response to the original message (such as adding a prefix of Re: to the title and giving a quotation mark at the beginning of a cited sentence of the original message).

The response message generated at the response generating section (104) is given to the message storing section (102) where messages are stored.

In the message storing section (102), it is determined whether the message is to be stored in the message storing DB (101) of Server A or to be stored in a message storing DB of another server (hereinafter referred to as "Server B" (301).

The determination is made as follows. If the remaining capacity of the message storing DB of Server A is more than a threshold value even when a message is stored, the message is stored in the message storing DB (101) of Server A.

If the remaining capacity of the message storing DB (101) of Server A becomes equal to or less than the threshold value when the message is stored, a user specifies a keyword in the message to be stored from his or her PC. Using the specified keyword, the message retrieving section (105) starts retrieving the message in message storing DBs of all other servers. When the message is found, the remaining capacity of the message storing DB is checked if it is equal to or below the threshold value when the message is stored in the message storing DB in which the retrieved message is stored, and if not, the message is stored in that message storing DB.

As a result of this message retrieval, when the message is not found or, even when the message is found, if a message is stored in the message storing DB where the message is stored and the remaining capacity of the message storing DB becomes equal to or less than the threshold value, the keyword search is conducted again by using an alternative but similar keyword.

When Server B is chosen, for example, as a server to store the message, the link-message generating section (106) is called.

In the link-message generating section (106), a prefix of "Ln:" is given to a title as a link message, and a link file having the address (link address) in which information corresponding to the contents of information is stored is generated (302).

After this process, the message transfer section (107) is called and the actual message file is transferred from Server A to Server B (303).

Then, in Server A, the information of the link file is given to the message storing section (102), and the link file is stored in the message storing DB (101) of Server A.

Also, in Server B, the message file information transferred from Server A is given to the message storing section (112) of Server B through the message transfer section (117) of Server B, and the message file is stored in the message storing DB (111) of Server B (304).

When Server A is chosen as a server to store the message, the processes (302) (303) are skipped, the message file information is given to the message storing section (102) of Server A, and the message file is stored in the message storing DB (101) of Server A (304).

In this way, even when a response to the original message, which used to be in the message storing DB (101) of Server A, is stored in the message storing DB (102) of Server B, storage of the messages is achieved while relating them to each other.

Figure 4:
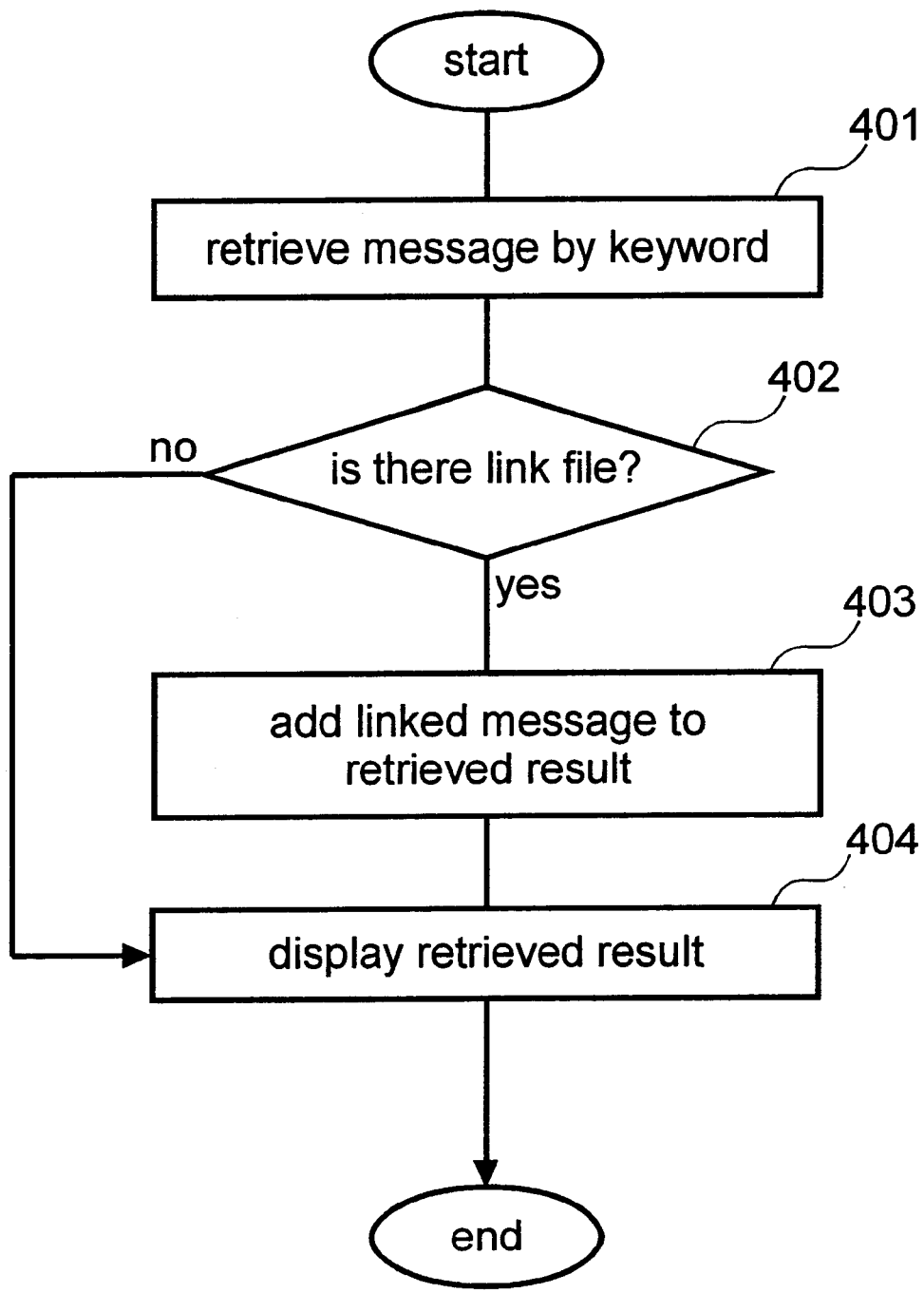
FIG. 4 is a flowchart to show how a message is retrieved in the embodiments.

FIG. 4 is a flowchart to show how messages are retrieved in the embodiment.

In the message retrieval, the message retrieving section retrieves the message which corresponds to a keyword by using the keyword specified by a user (401).

When the retrieval is completed, the message retrieving section determines whether there is a link file in the retrieved result (402) or not, and if there is, a message to which the file is linked is added to the retrieved result (403).

After this process, information of the retrieved result of the message is given to the message display section, which displays the retrieved result as a list (404).

When the retrieval is completed in (401), whether there is a link file or not is determined (402). If there is not a link file, the process of (403) is skipped and the retrieved result is displayed as a list by the message display section (404).

In this way, when message retrieval is done by using a keyword, the retrieval of a message which contains the keyword and another message related to the message is carried out at the same time.

Specific examples of workings of the embodiments described above will be explained referring to FIGS. 1 and 2.

1. When Linked to a Message
(1) Message 1 is entered from a PC (108). The message 1 is, for example, a question "Tell me about C"
(2) The message 1 entered from PC (108) is stored in the message storing DB (101) by the message storing section (102).
(3) The PC (109) requests the message display section (103) to display a list of messages.
(4) The message display section (103) sends (displays) the message stored in the message storing DB (101) to (on) the PC (109).
(5) As a message responding (or related) to the message 1 displayed in (4), the message 2 entered by a user is entered from the PC (109) through the response generating section (104).
(6) The message 2 entered from PC (109) is stored in the message storing DB (101) by the message storing section (102).
(7) In order to show that the message 2 is related to the message 1, "_1" is added to a file name of the message 1.
(8) Another user of Server B wants to see a list of messages in Server B from PC (118).
(9) This user requests the message display section (113) to display a list of messages from the PC (118).
(10) The message display section (113) sends (displays) the message in the message storing DB (111) to (on) the PC (118). Further, through the message transfer section (117) and the message transfer section (107), the message in the message storing DB (101) is requested to the message display section (103).
(11) The message display section (113) sends (displays) the requested message to (on) the PC (118).
(12) As a message to respond (or related) to the message 1 displayed in (11), the response generating section (114) enters a message 3 from the PC (118).
(13) The message 3 entered from the PC (118) is stored in the message storing DB (111) by the message storing section (112).
(14) In order to show that the message 3 stored in Server B is related to a message in Server A, the response generating section (114) requests the link-message generating section (106) to set a link file by a name with "_-1" added to the message 1.

2. When Retrieving Messages
(1) Message retrieval is requested to the message retrieval section (105) from PC (108).
(2) The message retrieval section (105) retrieves an applicable message from the message storing DB (101). Then, it is checked if there is a link file in the retrieved message, and if there is, the following steps (3) to (6) are executed.
(3) The message transfer section (107) is requested to take out a message to which the original message is linked.
(4) The message transfer section (107) requests the message retrieving section (115) to retrieve using the message transfer section (117).
(5) The message retrieving section (115) takes an applicable message out of the message storing DB (111), and sends the message to the message transfer section (107) by using the message transfer section (117).
(6) The message transfer section (107) gives the message to the message display section (103).
(7) The message display section (103) sends (displays) a list of retrieved messages to (on) the PC (108).

Now, referring to the drawings, the second embodiment of the present invention will be described.

Figure 5:
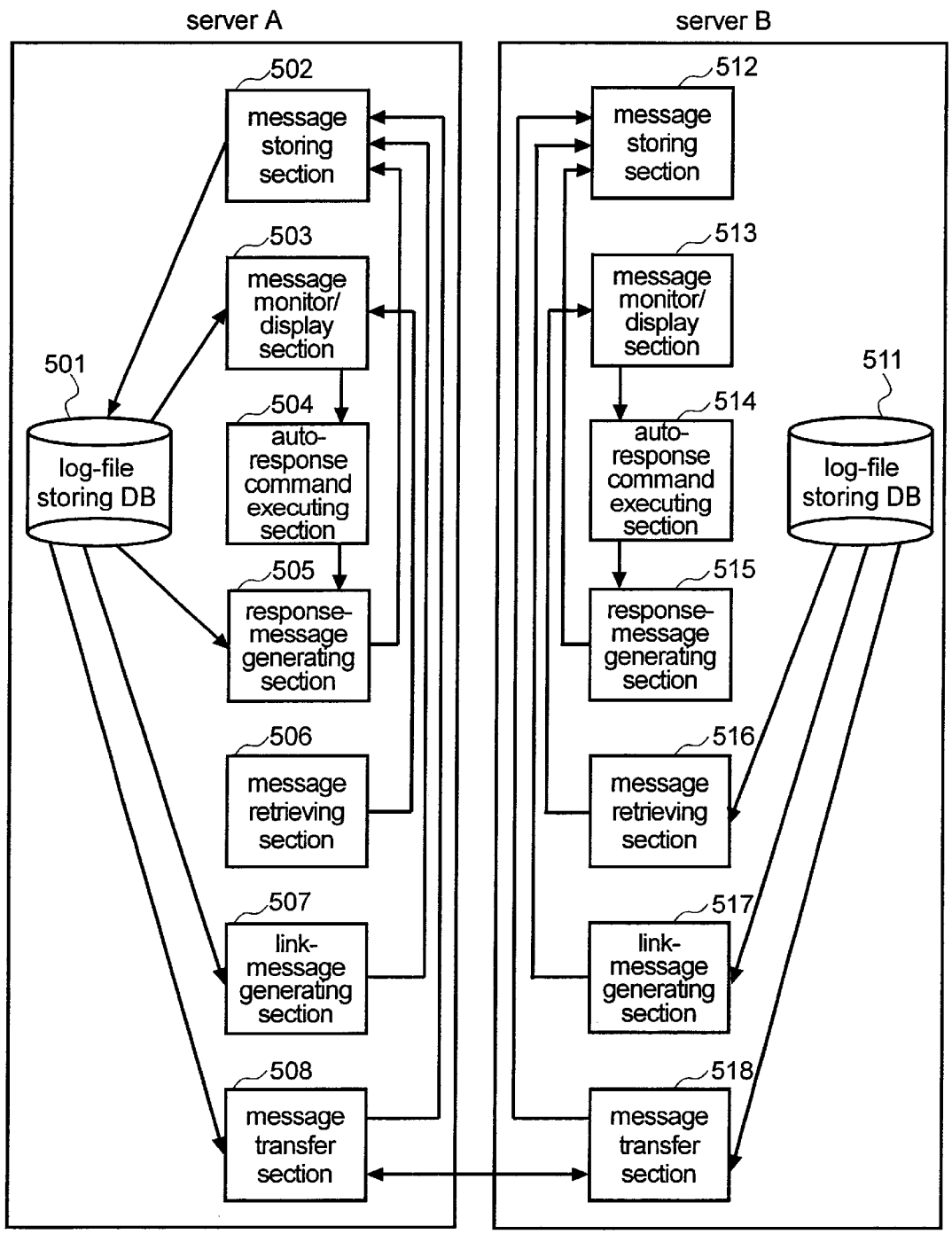
FIG. 5 show a whole configuration of a second embodiment of the present invention in which a message is a log message.

FIG. 5 shows a whole configuration of the second embodiment of the present invention when the message is a log message.

In FIG. 5, with regard to Servers A and B, the configuration of portions related to the present invention only is shown.

Server A comprises: a log-file storing DB (501) which is a database storing log files; a message storing section (502) performing the process of storing messages in the log-file storing DB; a message monitor/display section (503) having both the function of monitoring messages and the function of displaying messages for users; an auto-response command execution section (504) executing the auto-response commands to messages; a response-message generating section (505) generating messages with respect to the execution of the response command; a message retrieving section (506) retrieving messages stored in DB; a link-message generating section (507) generating a link message to another message related to the original message; and a message transfer section (508) communicating with other servers.

Further, the display section in the above message monitor/display section (103) in Server A is a section to create display information of the message. In practice, the created display information is sent to a user's PC connected to the server and displayed on the PC.

Each server is provided with such a configuration. Namely, there is Server B having the same functions (511 to 518) as those (501 to 508) configured in Server A, and messages are sent and received between Server A and Server B by using the message transfer sections (508, 518).

FIG. 6 shows a format of a file to be stored in the log-file storing DB in the second embodiment.

The file has a machine name, an event ID, a time stamp and a branch number as its attributes.

The branch number "_1" is given to a response message and the branch number "_1_1" is given to a further response message to the response message.

Thus, by retrieving a file whose other attributes (machine name, event ID, time stamp) are the same and with a branch number, a response message to the applicable message and another response message to the response message can be easily retrieved.

Thus, when a particular event (message) occurs, another event caused by the event can be detected.

Figure 7:
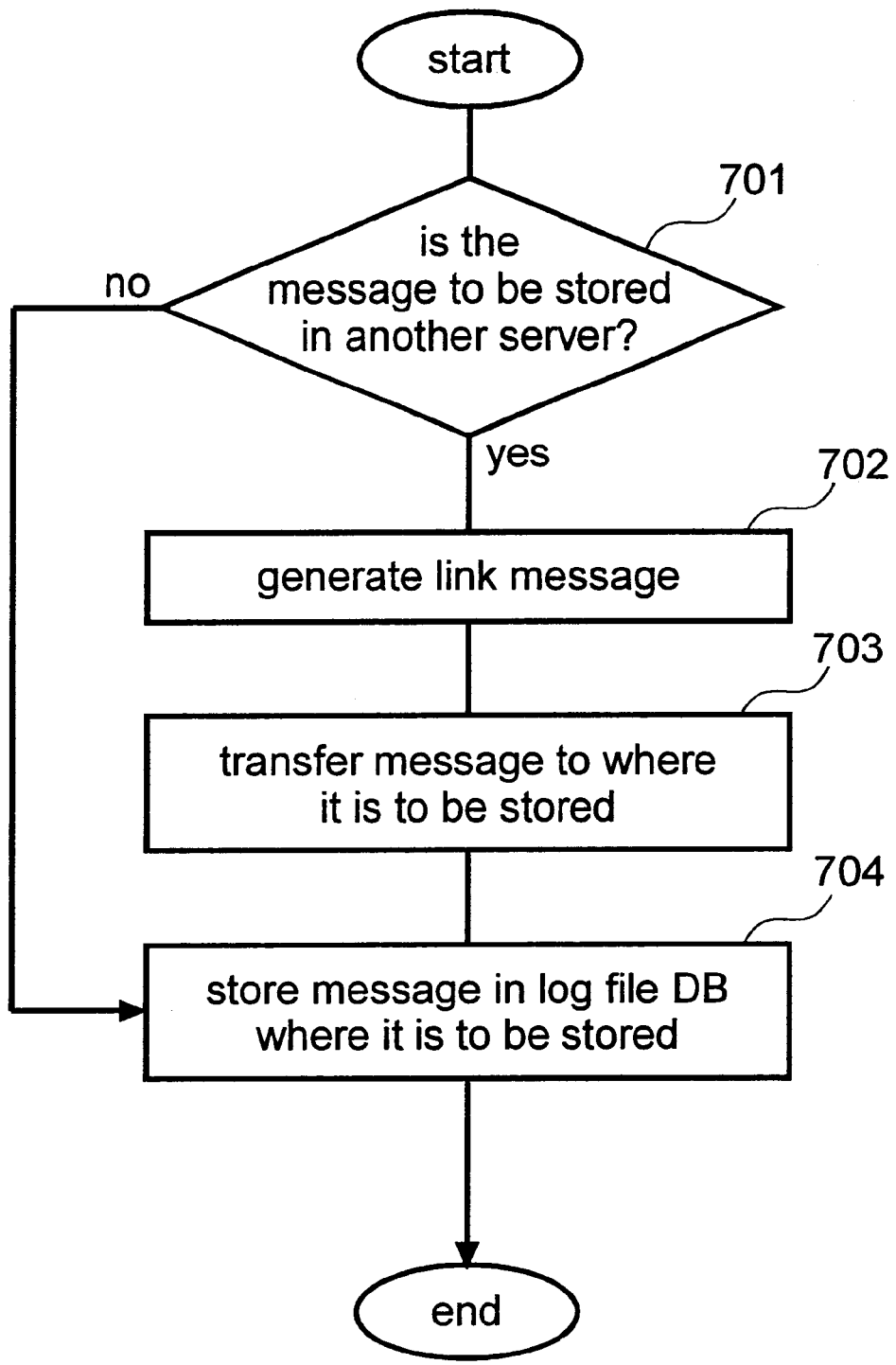
FIG. 7 is a flowchart to show how the log message is stored in the second embodiment.

FIG. 7 is a flowchart to show how a log message is stored in the second embodiment.

To a log message monitored and displayed by the message monitor/display section (503) of Server A, the auto-response command execution section (504) generates a response command corresponding to the log message, executes the generated response command, and generates a response message according to the execution.

When the response message is generated, the response generating section (505) of Server A is called, and its message information is given to the response generating section (505).

In the response generating section (505), as a process to show that the response message is a response to the original log message, a branch number "_1" is given.

The response message generated in the response generating section (505) is given to the message storing section (502) where messages are stored.

In the message storing section, it is determined whether the contents of the message belong to Server A or not (701). If it is the message to be stored in another server (hereinafter referred to as "Server B"), the link-message generating section (507) is called.

In the link-message generating section (507), as a link message, a file whose contents of information include an address of a server in which the response message is stored is generated (702).

After this process, the message transfer section (508) is called, and the response message is transferred from Server A to Server B (703).

In Server A, information of the link message is given to the message storing section (502), and the link message is stored in the log-file storing DB (501) of Server A.

Also, in Server B, the response message transferred from Server A is given from the message transfer section (518) of Server B to the message storing section (512) of Server B. The response message is then stored in the log-file storing DB (511) of Server B (704).

When the contents of the response message is determined as those of Server A in (701), processes (702) (703) are skipped and the response message is stored in the log-file storing DB (501) of Server A (704).

In this way, when a response message to a message generated in Server A is stored in the log-file storing DB (511) of Server B, the cause-effect relation between them can be stored while establishing file associations.

Figure 8:
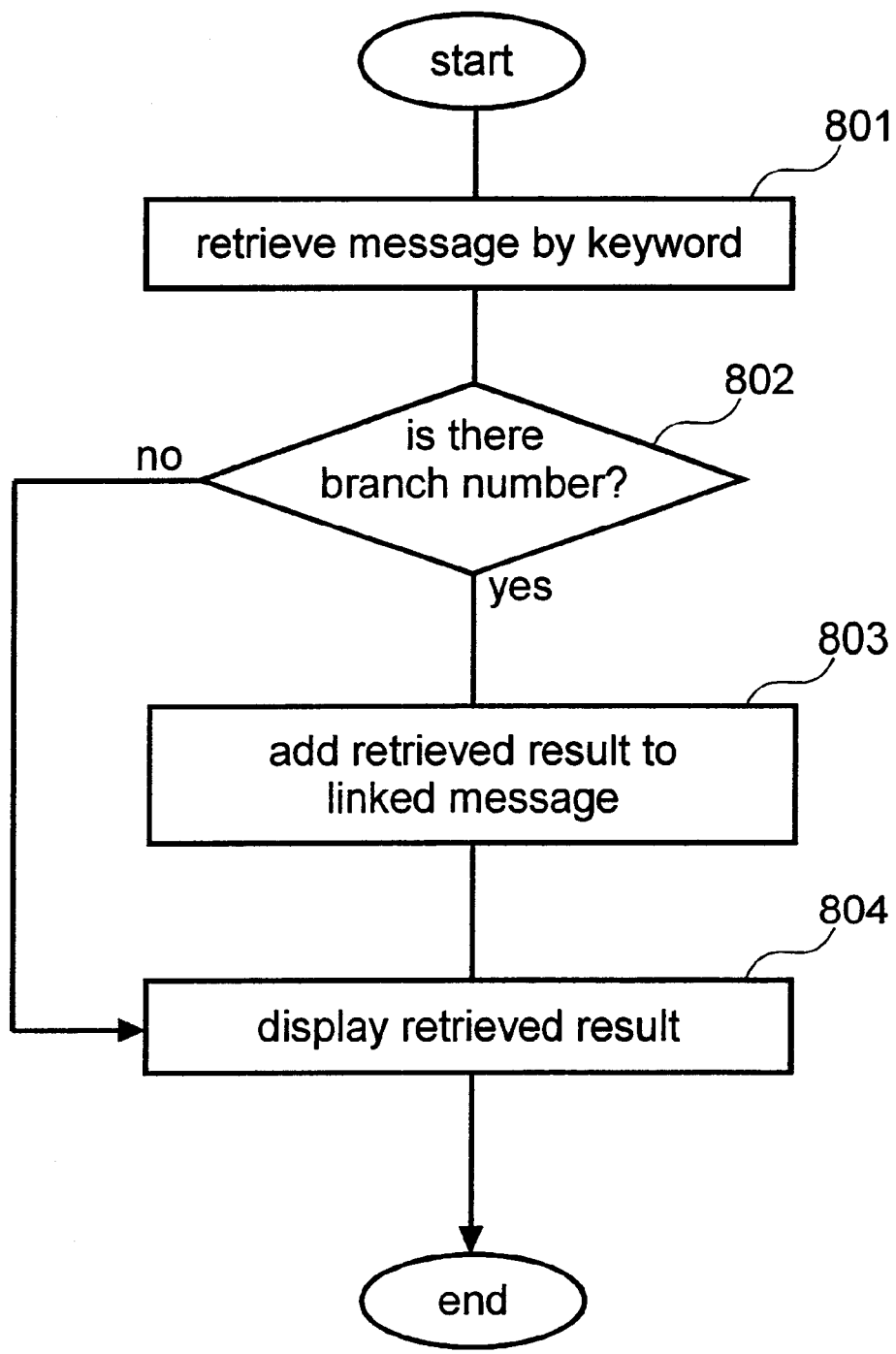
FIG. 8 is a flowchart to show how the log message is retrieved in the second embodiment.

FIG. 8 is a flowchart to show how a log message is retrieved in the second embodiment.

The message retrieving section (506) retrieves a message using a keyword specified by a user (801).

When the retrieval is over, the message retrieving section (506) checks if there are branch numbers in the retrieved result (802). When there are branch numbers, messages with such branch numbers are added to the retrieved result. If the message is a link message, a linked message is added to the retrieved result (803).

After this process, the information of the retrieved result of the message is given to the message monitor/display section (503), which displays the retrieved result on a user's PC as a list of retrieved result (804).

As a result of the determination in (802), when there is no branch number, the process of (803) is skipped, and the message monitor/display section (503) displays the retrieved result on the user's PC as a list of the retrieved result (804).

In this way, when messages in a log file are retrieved by a keyword, in addition to messages containing the keyword, a message generated in response to the message and related messages can retrieved at the same time.

According to the present invention, in retrieving a message, related messages can be easily retrieved without manually associating such messages beforehand.

The foregoing invention has been described in terms of preferred embodiments. However, those skilled, in the art will recognize that many variations of such embodiments exist. Such variations are intended to be within the scope of the present invention and the appended claims.

What is claimed is:

1. A message-file storing/retrieving system by a computer comprising:
   a means to give, as a file name of a message file of a second message generated as a message related to a first message, a file name of a message file of the first message having caused the second message, and further to give the file name branch-number information showing that said second message is a message related to the first message;
   a means to store the message file in a database connected to a computer; and
   a means to retrieve, according to a keyword, a message file containing the keyword from said database and, as a result of the retrieval, to output the message file and a message file having a file name which is made by giving said branch-number information to the file name of the message file.

2. A message-file storing/retrieving system according to claim 1 further comprising:
   a means to give, when storing while linking the message file of said second message in the database connected to another computer, a file name of the message file of said first message as a file name and, further, to give the file name branch-number information showing that said second message is related and linked to the first message, and to generate, as contents of information, a link file to which storing address of the database connected to said another computer in which the message file of said second message is stored; and
   a means to store the generated link file in the database connected to said computer.

3. A message-file storing/retrieving system according to claim 2, wherein a message of said each message file is a message in a home page and a file name of the each message file is an address of said home page.

4. A message-file storing/retrieving system according to claim 2, wherein a message of said each message file is a log message, the file name of the each message file is a machine name or an event ID, and the message-file storing/retrieving system further has an auto-response command executing means executing the process to the log message.

5. A message-file storing/retrieving system according to claim 2, wherein the message of said each message file is the message of electronic mail, and the file name of the each message file is a mail address of said electronic mail.

* * * * *